United States Patent
Qu (10) Patent No.: US 10,216,339 B2
(45) Date of Patent: Feb. 26, 2019

(54) DISPLAY SUBSTRATE AND MANUFACTURING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 236 days.

(21) Appl. No.: 14/547,658

(22) Filed: Nov. 19, 2014

(65) Prior Publication Data
US 2016/0048238 A1 Feb. 18, 2016

(30) Foreign Application Priority Data
Aug. 15, 2014 (CN) .......................... 2014 1 0404371

(51) Int. Cl.
*G06F 3/044* (2006.01)
(52) U.S. Cl.
CPC .... *G06F 3/044* (2013.01); *G06F 2203/04103* (2013.01); *G06F 2203/04111* (2013.01)
(58) Field of Classification Search
None
See application file for complete search history.

(56) References Cited

U.S. PATENT DOCUMENTS

| | | | |
|---|---|---|---|
| 2012/0081332 A1* | 4/2012 | Atsuta | G06F 3/044 345/174 |
| 2013/0162549 A1* | 6/2013 | Kim | G06F 3/0412 345/173 |

(Continued)

FOREIGN PATENT DOCUMENTS

| | | |
|---|---|---|
| CN | 101943970 A | 1/2011 |
| CN | 103033979 A | 4/2013 |

(Continued)

OTHER PUBLICATIONS

First Chinese Office Action dated Aug. 5, 2016; Appln. No. 201410404371.6.

(Continued)

*Primary Examiner* — Matthew Yeung
(74) *Attorney, Agent, or Firm* — Ladas & Parry LLP (57) ABSTRACT

A display substrate and a manufacturing method thereof, as well as a display device are provided. The display substrate includes a base substrate, a color filter layer, a touch electrode layer and a bridging layer. The touch electrode layer includes first and second touch electrodes intercrossing and insulated from each other, the first touch electrode includes a plurality of first touch sub-electrodes arranged in an extension direction of the first touch electrode. The plurality of first touch sub-electrodes are electrically connected with one another by a bridging line in the bridging layer. Vias for electrically conducting the first touch sub-electrodes and the bridging line are provided in the color filter layer. Since the color filter layer serves as an insulating layer between the touch electrode layer and the bridging layer, it is possible to omit the step of providing individual insulating layer, thereby reducing the number of masks.

10 Claims, 9 Drawing Sheets

(56) References Cited

U.S. PATENT DOCUMENTS

| | | | |
|---|---|---|---|
| 2013/0341651 A1* | 12/2013 | Kim | G06F 3/0412 |
| | | | 257/84 |
| 2014/0061597 A1* | 3/2014 | Choi | H01L 51/5284 |
| | | | 257/40 |
| 2014/0078414 A1* | 3/2014 | Lee | G06F 3/041 |
| | | | 349/12 |
| 2014/0184940 A1* | 7/2014 | Ma | G02F 1/13338 |
| | | | 349/12 |
| 2015/0054803 A1* | 2/2015 | Yashiro | G06F 3/041 |
| | | | 345/206 |
| 2016/0188070 A1 | 6/2016 | Ko et al. | |

FOREIGN PATENT DOCUMENTS

| | | |
|---|---|---|
| CN | 103197463 A | 7/2013 |
| EP | 2749999 A2 | 7/2014 |

OTHER PUBLICATIONS

Second Chinese Office Action dated Nov. 15, 2016; Appln. No. 201410404371.6.

\* cited by examiner

DISPLAY SUBSTRATE AND MANUFACTURING METHOD THEREOF, AND DISPLAY DEVICE

TECHNICAL FIELD

Embodiments of the present invention relate to a display substrate and a manufacturing method thereof, and a display device.

BACKGROUND

Figure 1A:
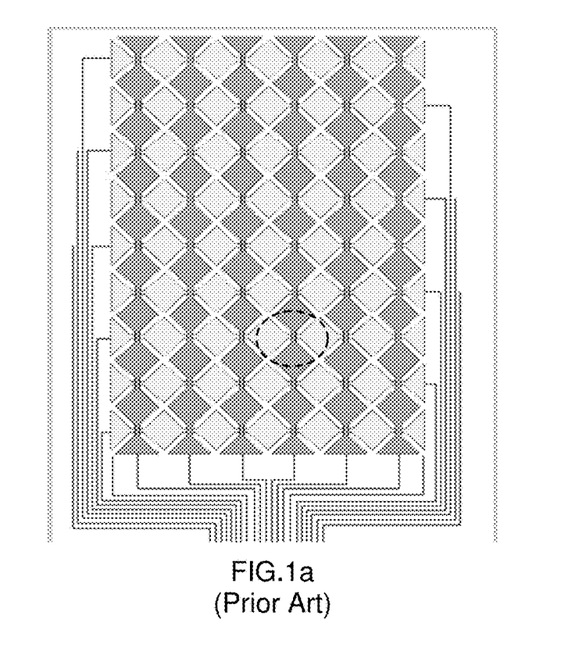
FIG. 1a is a structure diagram of a known capacitive touch screen.
Figure 1B:
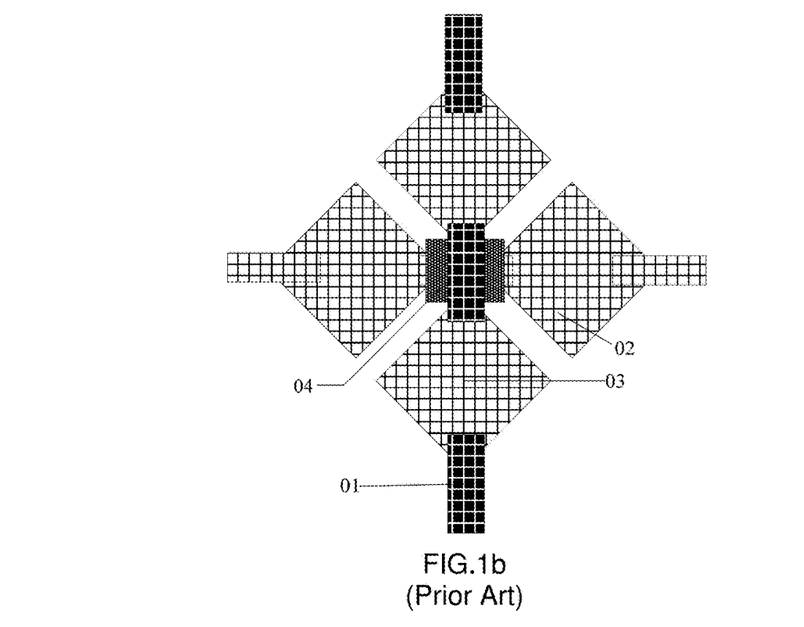

FIGS. 1a and 1b illustrate a color filter substrate in a known capacitive touch screen. Bridging lines of the bridging layer 01 are configured to connect a plurality of electrodes aligned in respective directions of the display device. The touch electrode layer comprises a plurality of touch sensing electrodes 02 and a plurality of touch driving electrodes 03, both of them are generally of diamond pattern or other patterns. The touch sensing electrodes 02 are arranged as intercross with and insulate from the touch driving electrodes 03. Adjacent and disconnected touch sensing electrodes 02 (or touch driving electrodes 03) are electrically connected with one another by the bridging line in the bridging layer 01. When the color filter substrate is touched, the capacitance of the touch point will change, which in turn causes change of current or pulse signal in different rows horizontally or vertically. Thus the position of touch point can be determined. The insulating layer 04 is configured for insulation between the bridging layer and the touch electrode layer.

SUMMARY

Embodiments of the present invention provide a display substrate and a manufacturing method thereof, and a display device.

According to the first aspect of the present invention, there is provided a display substrate comprising: a base substrate; a color filter layer, a touch electrode layer and a bridging layer disposed on the base substrate; wherein the touch electrode layer comprises a first touch electrode and a second touch electrode intercrossing and insulated from each other, the first touch electrode comprises a plurality of first touch sub-electrodes arranged in an extension direction of the first touch electrode, and the plurality of first touch sub-electrodes are electrically connected with one another by a bridging line in the bridging layer; wherein the color filter layer is provided with vias which are configured for electrically conducting the first touch sub-electrodes with the bridging line in the bridging layer.

As an example, the color filter layer comprises at least three color filters of different colors arrayed in sequence; wherein the vias are provided in color filters of same color; or each of the vias is made up of two half-vias which are respectively provided in two adjacent color filters of different colors.

As an example, the touch electrode layer and the bridging layer are disposed in an upper layer and a lower layer respectively, wherein the upper layer contacts the top of the color filters provided with the vias or half-vias, and the lower layer contacts the bottom of the color filters provided with the vias or half-vias.

As an example, the display substrate further comprises: a black matrix disposed on the base substrate, wherein the bridging line in the bridging layer is disposed in a region shielded by the black matrix.

As an example, each of the vias is made up of two half-vias which are respectively provided in two adjacent color filters of different colors; and the bridging layer is disposed between the black matrix and the color filters provided with half-vias As an example, the display substrate further comprises: a planarization layer disposed on all the color filters of the color filter layer, and a spacer layer disposed on the planarization layer; wherein the spacer layer is disposed in a region shielded by the black matrix.

As an example, the first touch electrode is a touch driving electrode, the second touch electrode is a touch sensing electrode; or the first touch electrode is a touch sensing electrode, and the second touch electrode is a touch driving electrode.

As an example, the display substrate is a color filter substrate or an array substrate.

According to the second aspect of the present invention, there is provided a display device comprising the above-mentioned display substrate.

According to the third aspect of the present invention, there is provided a manufacturing method of a display substrate, comprising:

forming a black matrix on a base substrate;

forming a bridging layer in a region shielded by the black matrix, wherein the bridging layer comprises a bridging line;

forming color filters provided with vias;

forming a touch electrode layer on the color filters provided with vias, wherein the touch electrode layer comprises a first touch electrode and a second touch electrode intercrossing and insulated from each other, the first touch electrode comprises a plurality of first touch sub-electrodes arranged in an extension direction of the first touch electrode; and the plurality of first touch sub-electrodes are electrically connected with one another by the bridging line in the bridging layer;

forming other color filters without the vias;

forming a planarization layer on all color filters; and forming a spacer layer on the planarization layer;

wherein the vias are configured to electrically conduct the first touch sub-electrodes with the bridging line in the bridging layer.

As an example, each of the vias is made up of two half-vias which are provided in two respective adjacent color filters of different colors.

As an example, the first touch electrode is a touch driving electrode, the second touch electrode is a touch sensing electrode; or the first touch electrode is a touch sensing electrode, and the second touch electrodes is a touch driving electrode.

As an example, the display substrate is a color filter substrate or an array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1b is a partially enlarged view of FIG. 1a;

FIG. 4b is a schematic diagram of sectional structure in A-A' direction of FIG. 4a;

FIG. 5b is a schematic diagram of sectional structure in A-A' direction of FIG. 5a;

FIG. 8b is a schematic diagram of sectional structure in B-B' direction of FIG. 8a.

DETAILED DESCRIPTION

In the color filter substrate of FIG. 1, there are many layers each having different pattern and hence requiring different mask, which makes the manufacturing process complicated, requires accurate alignment to the base substrate while using each mask, resulting in a low production efficiency and high manufacturing cost.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Thicknesses, region sizes and shapes of layer films in the drawings do not reflect the real scale of the display substrate, but only for illustration purpose.

Figure 2A:
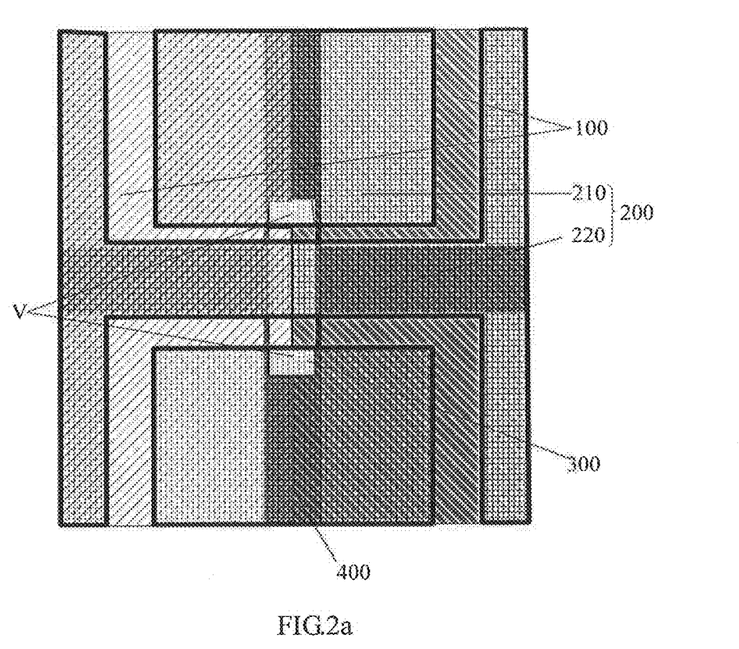
FIGS. 2a, 2b and 2c are structure diagrams of the display substrate provided in embodiment of the present invention respectively.
Figure 2B:
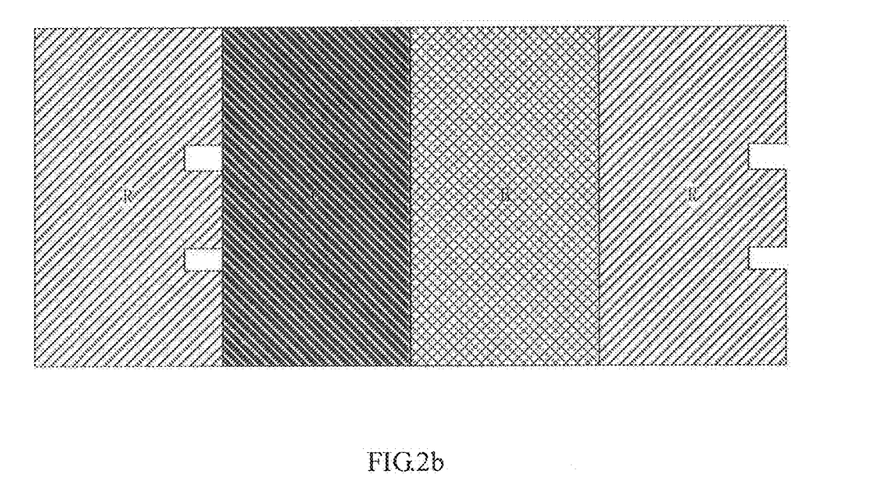
Figure 2C:
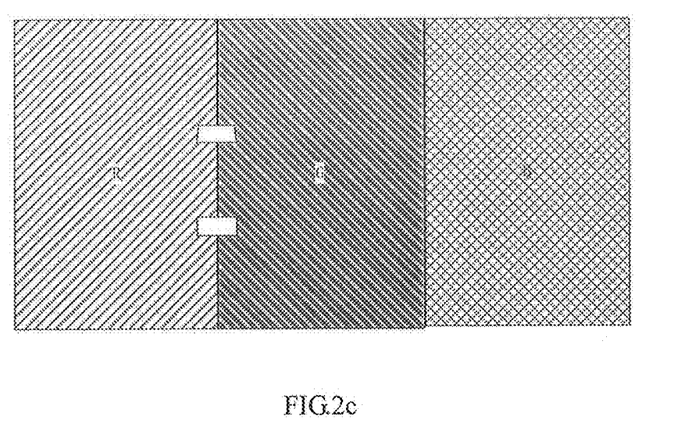

As illustrated in FIGS. 2a to 2c, a display substrate is provided in an embodiment of the present invention, it comprises a base substrate, on which a color filter layer 100, a touch electrode layer 200 and a bridging layer 300 are disposed.

The touch electrode layer 200 comprises a first touch electrode 210 and a second touch electrode 220, the first touch electrode 210 is disposed as intercross with and insulated from the second touch electrode 220. The first touch electrode 210 comprises a plurality of first touch sub-electrodes separated from one another and arranged in the extension direction of the first touch electrode 210. The plurality of first touch sub-electrodes are electrically connected with one another by a bridging line in the bridging layer 300.

Vias "V" configured for electrically conducting the first touch sub-electrodes and the bridging line in the bridging layer 300 are provided in the color filter layer 100.

In the display substrate provided in the embodiment of the present invention, the color filter layer is used as an insulating layer between the touch electrode layer and the bridging layer, thus, the step of forming the insulating layer may be omitted, which facilitates reducing the number of layers in the display substrate, thereby decreasing the number of the masks used, optimizing the production process, improving production efficiency and reducing the production costs.

In one example, the color filter layer 100 comprises at least three color filters in different colors arranged in sequence, for example, a red (R) color filter, a green (G) color filter and a blue (B) color filter sequentially arranged in parallel. The following description is given with a color filter layer constituted of RGB filters as an example. The color filter layer 100 may be provided with the vias "V" in same color filters. For example, as illustrated in FIG. 2b, the vias are disposed in two R color filters. It is also possible to provide two half-vias in two adjacent color filters of different colors to form the via "V". For example, as illustrated in FIG. 2c, two half-vias are disposed in two adjacent R,G color filters respectively to form a via so as to electrically conduct the respective first touch sub-electrodes in the first touch electrodes 210 with the bridging line in the bridging layer 300.

In one example, in order to facilitate the vias V to electrically conduct the respective first touch sub-electrodes in the first touch electrode 210 with the bridging line in the bridging layer 300, the touch electrode layer 200 and the bridging layer 300 are disposed in two different layers, i.e., the upper layer which contacts the top of the color filters provided with vias or half-vias, and the lower layer which contacts the bottom of the color filters provided with vias or half-vias. For example, the touch electrode layer 200 (or bridging layer 300) is first formed, the color filters provided with vias or half-vias are formed then, and the bridging layer 300 (or the touch electrode layer 200) is finally formed. The order of forming the bridging layer 300 and the touch electrode layer 200 may be interchanged. Further, after the formation of the bridging layer 300 (or the touch electrode layer 200), it is further required to form other color filters not provided with vias, thus the whole color filter layer is obtained.

In one example, as illustrated in FIG. 2a, the display substrate further comprises a black matrix 400 disposed on the base substrate. The material for the black matrix may be a black light-sensitive resin. The Bridging line in the bridging layer 300 is disposed in a region shielded by the black matrix 400.

For example, the black matrix 400 is disposed between the base substrate and the color filter layer 100, that is, black matrix 400 is first formed on the base substrate and then other layers are formed thereon.

In one example, in case that the via "V" is formed by providing two half-vias in two respective color filters of different colors, the lamination in the display substrate is that the bridging layer 300 is located between the black matrix 400 and the color filter provided with half-vias.

In one example, the display substrate further comprises a planarization layer, which is disposed over all the color filters of the color filter layer 100 and used for uniformation and planarization as well as for protecting the touch electrodes. The display substrate further comprises a spacer layer which is disposed on the planarization layer. The spacer layer is disposed in a region shielded by the black matrix and comprises pillar spacers with a certain height for supporting.

In one example, the first touch electrode 210 is a touch driving electrode and the second touch electrode 220 is a touch sensing electrode. Alternatively, the first touch electrode 210 is a touch sensing electrode, and the second touch electrode 220 is a touch driving electrode, which is not limited here.

There are two materials available for both the touch sensing electrode and the touch driving electrode: opaque conducting material and transparent conducting material. The transparent conducting material may be indium tin oxide or indium zinc oxide, and may also be carbon nanotubes and graphene. For opaque touch sensing electrodes and opaque touch driving electrodes, they may be formed in regions shielded by the black matrix, otherwise they might block the display light; for transparent touch sensing electrodes and transparent touch driving electrodes, they may be formed in any regions of the display substrate, which is more convenient for the design of display substrate.

In one example, the display substrate may be a color filter substrate or an array substrate, which is not limited here.

In one example, when the display substrate provided in embodiments of the present invention is applied to an array substrate, the array substrate generally comprises structures such as a thin film transistor, a gate and a data line. The specific structures may have multiple implementations, which is not limited here.

Figure 3:
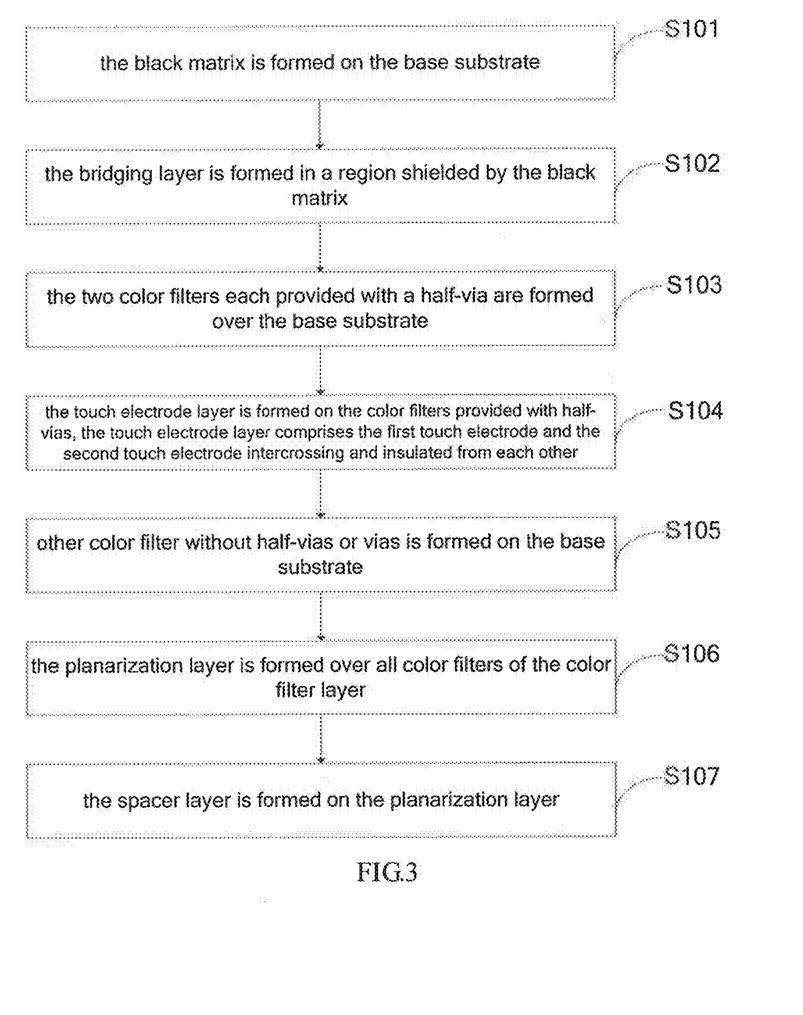
FIG. 3 is a flow chart of a method of manufacturing an display substrate provided in an embodiment of the present invention.

According to another embodiment of the present invention, there is further provided a method of manufacturing a display substrate, as illustrated in FIG. 3.

Figure 4A:
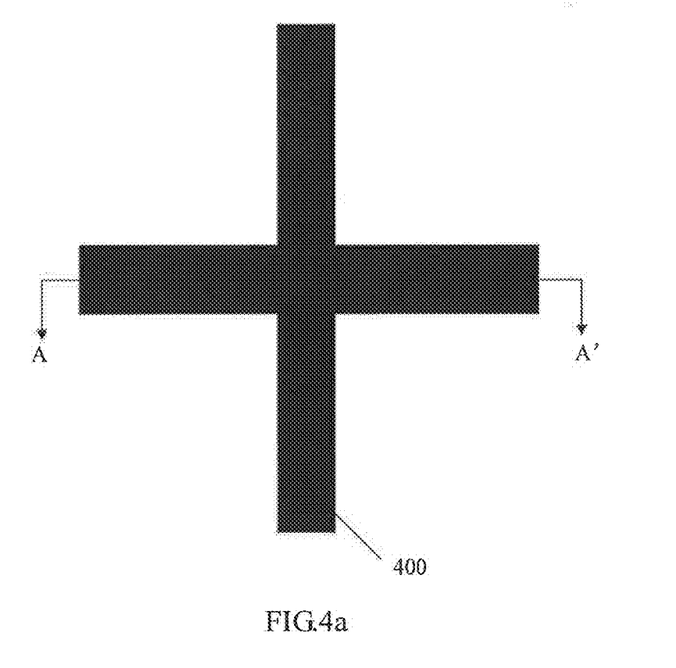
FIG. 4a is a structure diagram of an display substrate in the manufacturing method provided in an embodiment of the present invention after step S101.
Figure 4B:
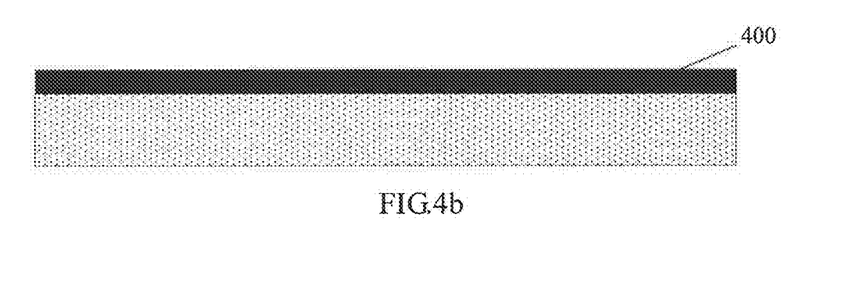

In S101, the black matrix 400 is formed on the base substrate as illustrated in FIGS. 4a and 4b.

For example, a photoresist of black light-sensitive resin is coated on the base substrate by spin-coating method, and then subjected to exposure, development and after-bake processing to form the black matrix 400.

Figure 5A:
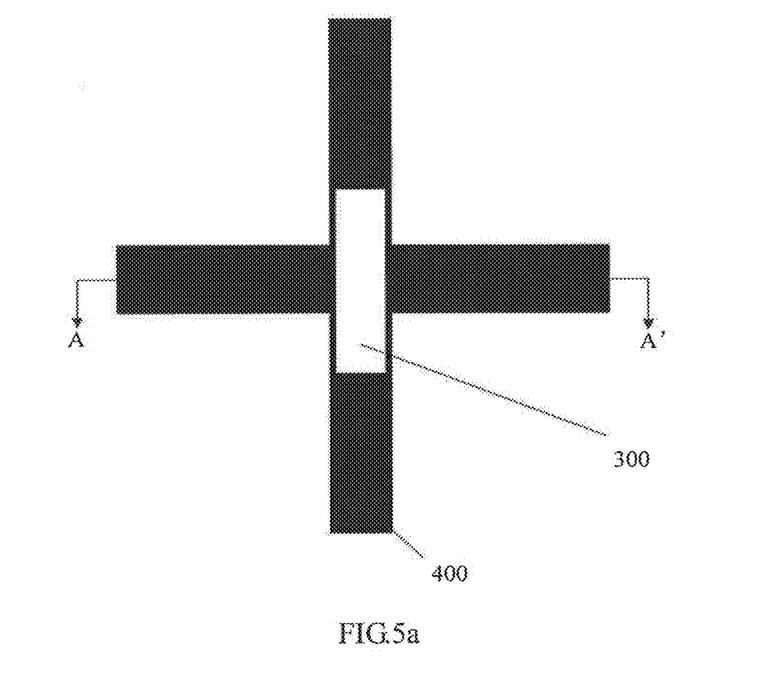
FIG. 5a is a structure diagram of the display substrate in the manufacturing method provided in an embodiment of the present invention after step S102.
Figure 5B:
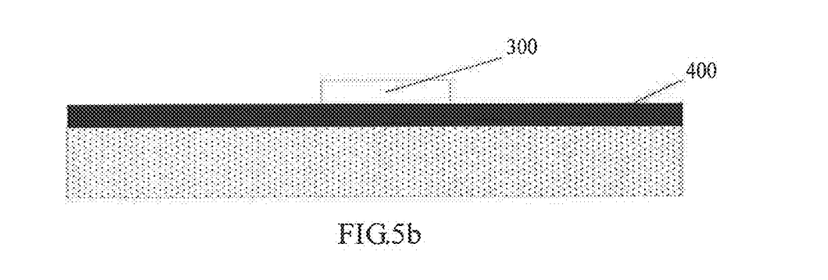

In S102, the bridging layer 300 is formed in a region shielded by the black matrix 400, as illustrated in FIGS. 5a and 5b.

For example, a layer of metal material is deposited on the base substrate by sputtering method, a photoresist is then coated on the layer of metal material, after subjected to the exposure, development and etching, the photoresist is peeled off to form the bridging line of the bridging layer.

In S103, the two color filters each provided with a half-via are formed over the base substrate.

Figure 6A:
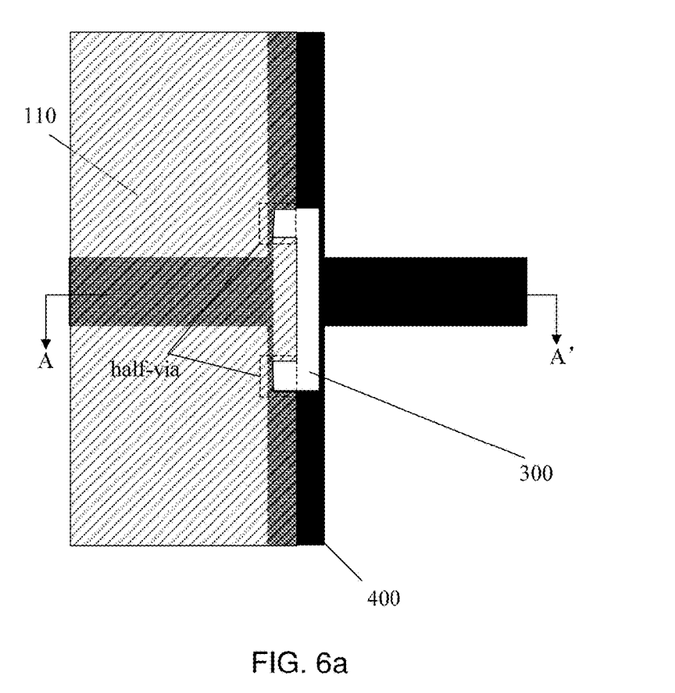
FIGS. 6a and 7a are structure diagrams of the display substrate in the manufacturing method provided in an embodiment of the present invention after step S103 respectively.
Figure 6B:
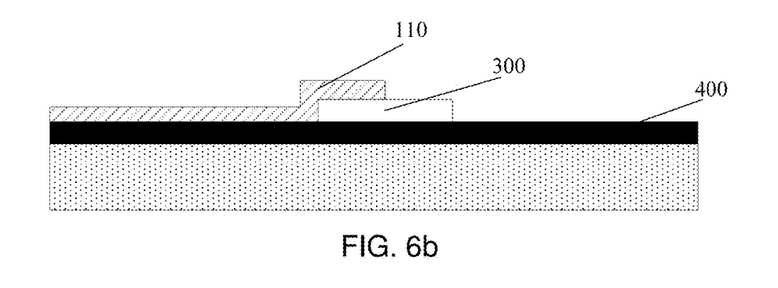
FIGS. 6b and 7b are schematic diagrams of sectional structure in A-A' direction of FIGS. 6a and 7a respectively.

For example, a layer of e.g., red glue material is coated on the base substrate by spin-coating method first, and then exposed, developed and etched to form the red color filter 110 provided with a half-via, as illustrated in FIGS. 6a and 6b.

Figure 7A:
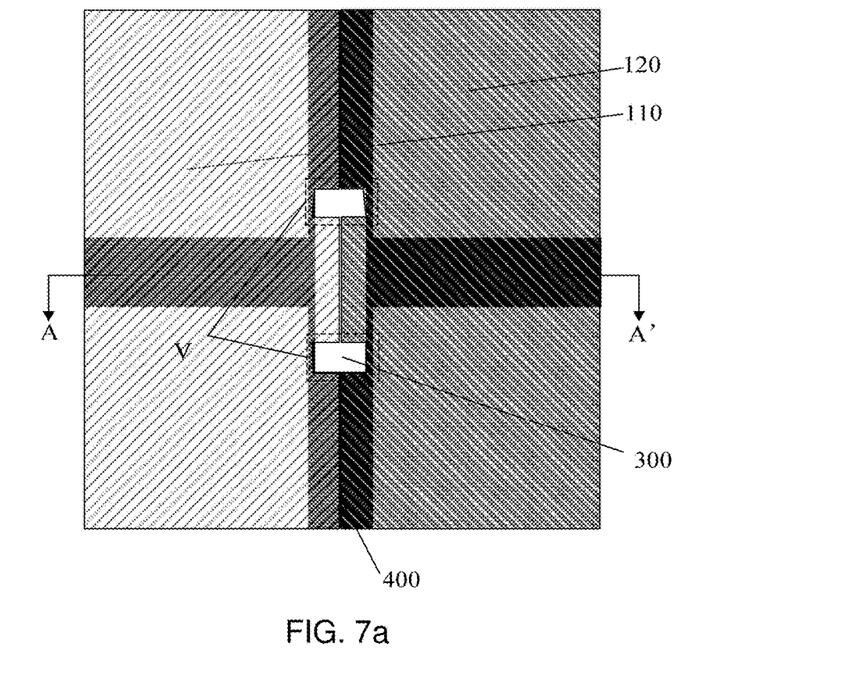
Figure 7B:
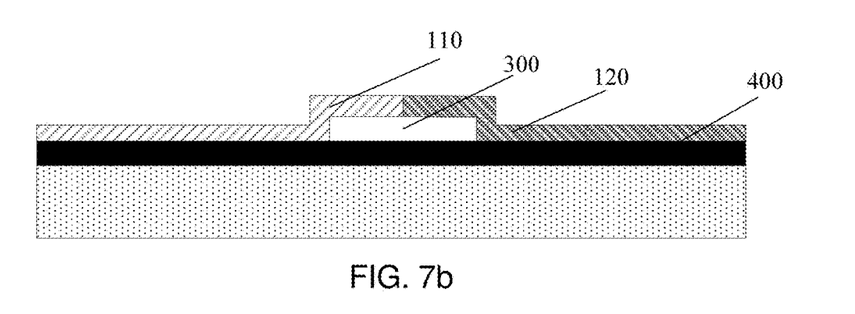

Next, a layer of e.g., green glue material is coated on the base substrate by spin-coating method first, and then exposed, developed and etched to form the green color filter 120 provided with a half-via, as illustrated in FIGS. 7a and 7b.

Figure 8A:
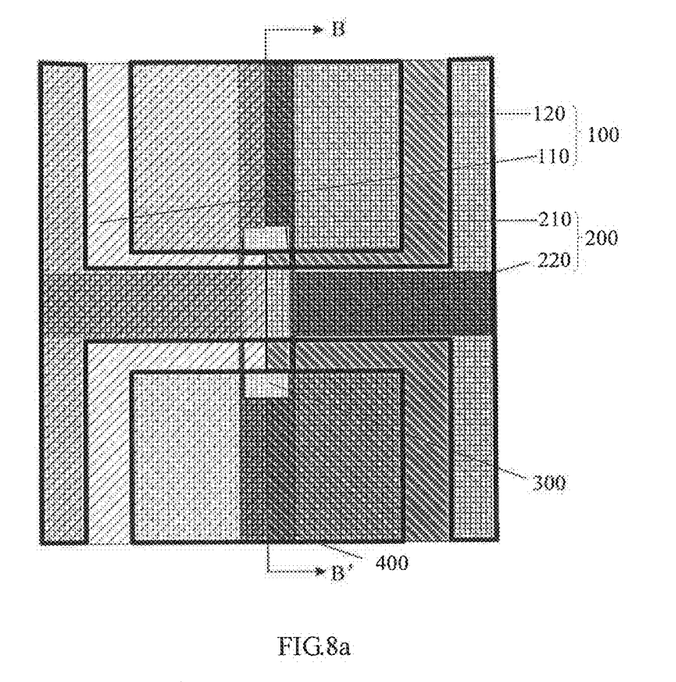
FIG. 8a is a structure diagram of the display substrate in the manufacturing method provided in an embodiment of the present invention after step S104.
Figure 8B:
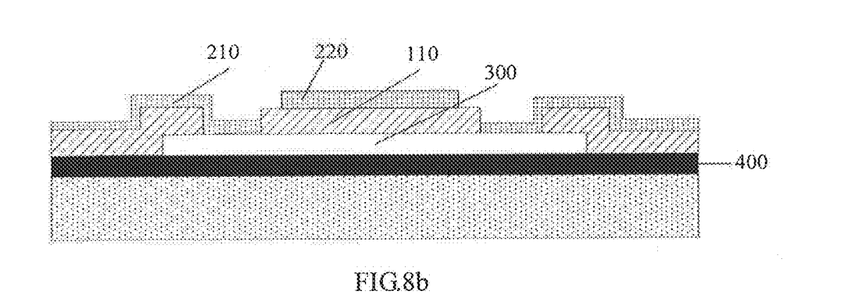

In S104, the touch electrode layer 200 is formed on the color filters provided with half-vias, the touch electrode layer 200 comprises for example: the first touch electrode 210 and the second touch electrode 220 intercrossing and insulated from each other. The first touch electrode 210 comprises a plurality of first touch sub-electrodes electrically connected with one another by the bridging layer 300, as illustrated in FIGS. 8a and 8b.

For example, there are two materials available for the touch electrodes: opaque conducting material and transparent conducting material. With the opaque conducting material, after exposure, development and etching processing, the touch electrode layer 200 in regions shielded by the black matrix is formed. With the transparent conducting material, after exposure, development and etching processing, the touch electrode layer 200 that may be located in any region of the display substrate is formed.

In S105, other color filter without half-vias or vias is formed on the base substrate.

For example, a layer of e.g., blue glue material is coated on the base substrate by spin-coating method and then exposed, developed and etched to form the B color filter. Thus, the R, G, B color filters forms a color filter layer.

In S106, the planarization layer is formed over all color filters of the color filter layer.

For example, a layer of resin material is first deposited on all color filters, and then exposed, developed and etched to form the planarization layer.

In S107, the spacer layer is formed on the planarization layer.

For example, a layer of spacer material is deposited on the black matrix, and then exposed, developed and etched to form the spacer layer in a region shielded by the black matrix. The spacer layer comprises pillar spacers with a certain height.

So far, the above-mentioned display substrate provided in embodiments of the present invention is manufactured by the above-mentioned steps S101 to S107. It is observed that in the above-mentioned manufacturing process, all together eight patterning processes are used, while in the method of manufacturing the known display substrate with separate insulating layer, nine patterning processes are needed. Therefore, in the display substrate provided in embodiments of the present invention, the separately disposed insulating layer is omitted, the number of layers in the display substrate is reduced, and the number of masks is reduced.

Yet another embodiment of the present invention further provides a display device comprising the above-mentioned display substrate provided in embodiments of the present invention, which is for example any product or component with display function such as a cell phone, a tablet computer, a TV set, a display, a notebook computer, a digital picture frame, and a navigator. Other constituent parts of the display device are familiar for those skilled in the art and will not be described any more here, nor will limit the present invention. Embodiments of the above mentioned display substrate may be referred to for implementations of the display device and repetitions will not be described any more here.

What is described above is related to the illustrative embodiments of the disclosure only and not limitative to the scope of the disclosure; the scopes of the disclosure are defined by the accompanying claims.

The present application is based on and claims priority of China patent application No. 201410404371.6 filed on Aug. 15, 2014, which is incorporated herein in its entirety by reference.

The invention claimed is:

1. A display substrate, comprising:
a base substrate;
a color fitter layer, a touch electrode layer and a bridging layer disposed on the base substrate;
a black matrix disposed under the color filter layer,
wherein the touch electrode layer comprises a first touch electrode and a second touch electrode intercrossing and insulated from each other, the first touch electrode comprises a plurality of first touch sub-electrodes arranged in an extension direction of the first touch electrode, and the plurality of first touch sub-electrodes are electrically connected with one another by a bridging line in the bridging layer;
wherein the color filter layer is provided with vias which are configured for electrically conducting the first touch sub-electrodes with the bridging line in the bridging layer;
wherein only the color filter layer is interposed between the second touch electrode layer and the bridging layer at positions where the second touch electrode layer and the bridging layer are in non-contact with each other, and the color filter layer is configured for insulating the second touch electrode layer from the bridging layer;
wherein the bridging layer is interposed between the color filter layer and the black matrix and is in contact with the black matrix.

2. The display substrate of claim 1, wherein the color filter layer comprises at least three color filters of different colors arrayed in sequence;
wherein the vias are provided in color filters of same color; or each of the vias is made up of two half-vias which are respectively provided in two adjacent color filters of different colors.

3. The display substrate of claim 2, wherein the touch electrode layer and the bridging layer are disposed in an upper layer and a lower layer respectively, wherein the upper layer contacts the top of the color filters provided with the vias or half-vias, and the lower layer contacts the bottom of the color filters provided with the vias or half-vias.

4. The display substrate of claim 3, wherein the bridging line in the bridging layer is disposed in a region shielded by the black matrix.

5. The display substrate of claim 4, wherein each of the vias is made up of two half-vias which are respectively provided in two adjacent color filters of different colors; and
the bridging layer is disposed between the black matrix and the color filters provided with half-vias.

6. The display substrate of claim 1, wherein the first touch electrode is a touch driving electrode, the second touch electrode is a touch sensing electrode; or the first touch electrode is a touch sensing electrode, and the second touch electrode is a touch driving electrode.

7. The display substrate of claim 1, wherein the display substrate is a color filter substrate or an array substrate.

8. A display device comprising a display substrate of claim 1.

9. The display substrate of claim 4, wherein an entire orthographic projection of the bridging layer in a plane of the base substrate is within an orthographic projection of the black matrix in the plane of the base substrate.

10. The display substrate of claim 4, wherein entire orthographic projections of the vias in a plane of the base substrate is within an orthographic projection of the black matrix in the plane of the base substrate.

* * * * *